United States Patent [19]

Horton et al.

[11] Patent Number: 4,664,705
[45] Date of Patent: May 12, 1987

[54] INFILTRATED THERMALLY STABLE POLYCRYSTALLINE DIAMOND

[75] Inventors: M. Duane Horton, Provo; Gary R. Peterson, Orem, both of Utah

[73] Assignee: Sii Megadiamond, Inc., Provo, Utah

[21] Appl. No.: 760,662

[22] Filed: Jul. 30, 1985

[51] Int. Cl.$^4$ ........................................... C22C 29/00
[52] U.S. Cl. .............................. 75/243; 156/DIG. 68; 264/125; 264/332; 419/2; 419/11; 419/48; 427/331; 428/408; 428/539.5; 501/99
[58] Field of Search ....................... 75/230, 243; 419/2, 419/11, 48; 420/441, 578, 590; 501/99, 125; 264/332, 60; 156/DIG. 68; 428/408, 539.5

[56] References Cited

U.S. PATENT DOCUMENTS

| | | | |
|---|---|---|---|
| 3,816,085 | 6/1974 | Hall | 51/307 |
| 3,819,814 | 6/1974 | Pope | 423/446 |
| 3,913,280 | 10/1975 | Hall | 51/307 |
| 4,104,344 | 8/1978 | Pipe et al. | 264/42 |
| 4,163,769 | 8/1979 | Pope et al. | 264/42 |
| 4,224,380 | 9/1980 | Bovenkerk et al. | 428/545 |
| 4,234,661 | 11/1980 | Lee et al. | 419/11 |
| 4,241,135 | 12/1980 | Lee et al. | 419/11 |
| 4,288,248 | 9/1981 | Bovenkerk et al. | 75/226 |
| 4,353,963 | 10/1982 | Lee et al. | 419/11 |
| 4,380,471 | 4/1983 | Lee et al. | 75/230 |
| 4,534,773 | 8/1985 | Phaal et al. | 51/293 |

Primary Examiner—Stephen J. Lechert, Jr.
Attorney, Agent, or Firm—Willian Brinks Olds Hofer Gilson & Lione Ltd.

[57] ABSTRACT

A polycrystalline diamond (PCD) body with improved thermal stability is disclosed which comprises a PCD body which has had at least one of its previously empty pores infiltrated by a silicon containing alloy. According to the process of the invention, a porous PCD body is obtained, preferably by acid leaching a PCD body which was formed in the presence of a metal catalyst such as cobalt. The porous PCD body is then surrounded by either the desired silicon containing alloy, or by the constituents of that alloy, each preferably in powdered form. The PCD body with its surrounding material is then heated and pressed to temperatures sufficient to melt the surrounding material (thereby forming the silicon alloy if not already formed) and to cause it to infiltrate into the pores. After the infiltration, it is preferred to remove the excess silicon containing alloy from the external surfaces of the PCD body, such as by an acid bath. It is also preferred to include several porous PCD bodies per process cycle. The metal component of the alloy together with the relative amounts of silicon can be selected in order to achieve the lowest melting point of the alloy and the best performance characteristics of the infiltrated PCD bodies.

39 Claims, 1 Drawing Figure

INFILTRATED THERMALLY STABLE POLYCRYSTALLINE DIAMOND

BACKGROUND OF THE INVENTION

This invention relates to polycrystalline diamond as well as to processes for manufacturing it. As used in the following specification and claims, the term "polycrystalline diamond" or "PCD" refers to the type of material which has a structure characterized by substantial intercrystalline bonding between adjacent diamond crystals.

In recent years the manufacture and use of polycrystalline diamond (PCD) in various applications has become well established. In many applications a PCD body is used as a distinct cutting element, such as for turning non-ferrous metals, and is held and supported by some type of tool holder. In other applications, several relatively small pieces of PCD are held within a matrix to create a tool, such as a core drill or rock saw blade, with multiple cutting elements.

One problem common to both types of applications is the fact that PCD has limited thermal stability. In particular, most PCD is produced in the presence of a catalytic metal or alloy, such as cobalt, which promotes the sintering and formation of intercrystalline bonds between the diamond crystals. Often, the catalytic material is present in the form of a powder which is intermixed with the diamond crystals before pressing, or it is included in an adjacent element from which it infiltrates through the diamond crystals during the pressing. In either process, the resultant PCD compact includes a dispersion of the catalytic material located within a network of pores between the now sintered diamond crystals. It has heretofore been observed that the presence of the catalytic material within these pores can have detrimental effects, particularly when subjected to high temperatures. In U.S. Pat. Nos. 4,224,380 and 4,288,248, it was noted that, when the catalytic material is a metal such as cobalt and when the PCD compact is subjected to temperatures above approximately 700° C., the metal, because it has a higher coefficient of thermal expansion than diamond, expands more than the diamond which thereby causes fracturing throughout the PCD structure. As a consequence, PCD made with a cobalt or other metal catalyst has generally had to be kept below 700° C., thereby limiting the tooling applications of PCD to those wherein the tool could be fabricated and used at temperatures below 700° C. In addition, the matrices in which PCD could be set were limited to those having a formation temperature below 700° C. These temperature constraints were particularly disappointing in light of the fact that single crystal diamond itself is adequately stable to about 1200° C.

Another problem caused by the presence of the catalyst metal in the pores of the PCD involves the fact that, particularly at high temperatures, the catalyst can facilitate the reversion of the diamond to graphite at lower temperatures and/or at faster rates thereby damaging the PCD structure when subjected to high temperatures.

A partial solution to these problems was taught in the '380 and '248 patents mentioned above. The solution was to chemically leach or otherwise remove the catalyst metal from the PCD compact after it was formed. In this way, the benefits of using a catalyst such as cobalt were retained while providing a PCD compact which was not as susceptible to thermal degradation through the mechanisms just described. See also, U.S. Pat. Nos. 4,104,344 and 4,163,769 which likewise teach the removal of a catalyst metal from the pores of a PCD body by acid leaching.

Unfortunately, at least one problem has remained with this approach to achieving improved thermal stability. This problem involves the fact that these leached PCD pieces with their network of now empty pores possess a tremendously increased surface area. The increase is so great because the diamond crystals and the empty pores are relatively small (as small as 1 micron or less). As a result, much more of the diamond in the PCD structure is exposed to the air in a leached piece as compared to an unleached piece. This is a disadvantage because diamond is subject to oxidation, particularly when subjected to higher temperatures. Therefore, although the leached PCD pieces have improved thermal stability over the prior pieces with cobalt in the pores, the leached pieces still have limited thermal stability due to the more rapid oxidation of the exposed diamond in the leached structure.

SUMMARY OF THE INVENTION

It is therefore a general object of the present invention to solve the aforementioned problems by providing a polycrystalline diamond body with increased thermal stability as well as providing the process for making it. Briefly, the present invention comprises a PCD body which has had at least some of its previously empty pores infiltrated by a silicon containing alloy.

In slightly more detail, the PCD body of the present invention comprises diamond crystals directly bonded to each other to form a polycrystalline mass and a series of pores or spaces which communicate either directly or indirectly with an external surface of the body. These pores were created at the time the polycrystalline mass was formed. The PCD body also includes a silicon containing alloy, i.e. silicon combined with at least one metal, which has been infiltrated into at least some of the previously empty pores from outside the PCD body in a step subsequent to the formation of the PCD.

The process for making such an infiltrated PCD body includes the step of providing a porous polycrystalline diamond body, i.e. a PCD body with a series of empty pores or spaces which communicate with an external surface of the body. The porous PCD body is surrounded with a quantity of material containing silicon. This material can comprise either silicon in a pre-alloyed state, free silicon in combination with a metal with which the silicon will form an alloy, or combinations thereof. Heat and pressure are applied to cause the silicon containing material to form the silicon alloy (if not previously formed) and to cause the silicon containing alloy to infiltrate into at least some of the empty pores.

After the PCD body has been infiltrated, it is preferable to remove the excess silicon containing alloy from the outer surface of the PCD body after the infiltration step by chemical leaching or other means while being careful to remove as little as possible of the silicon containing alloy from the PCD body's pores. It is also preferable in the process to start with several such porous PCD bodies in a single reaction chamber to thereby increase the output of infiltrated PCD bodies per process cycle.

An advantage of the present invention is that this PCD body with the silicon containing alloy infiltrated into its otherwise empty pores exhibits increased thermal stability over both PCD with a catalytic metal in its pores as well as PCD with empty pores. An additional advantage is that the PCD bodies infiltrated according to the present invention have shown increased toughness, i.e. resistance to fracture.

DETAILED DESCRIPTION

The first step in the process of the present invention is to provide at least one polycrystalline diamond body which includes empty pores. In particular, such a PCD body comprises diamond crystals which have been subjected to sufficient heat and pressure to cause substantial intercrystalline bonding in the resultant body which is between 65 and 98 percent diamond by volume. This PCD body must also comprise a series of empty pores which communicate either directly or indirectly with an external surface of the PCD body. The PCD body may also include "blind" pores which do not communicate with the external surface, but these should not affect or be affected by the process of this invention.

One method of obtaining a PCD body with empty pores is to start with a PCD body made by pressing diamond crystals in the presence of a catalytic material such as cobalt. When this is done, it has been observed that small amounts of the catalytic material remain within pores or pockets of the PCD structure. It has been found that this residual catalytic material can have a detrimental effect on the PCD body and methods have therefore been devised to remove it from the PCD body. U.S. Pat. Nos. 4,224,380 and 4,288,248, the entire disclosures of which are incorporated herein by reference, teach that, after the PCD compact has been formed, much of the catalytic material can be removed by acid or other chemical leaching as well as by electrolytic depletion. The resultant PCD body thereby includes a series of empty pores located where the catalytic material has been removed.

An alternative method of obtaining a PCD body with empty pores is to form the PCD body without any catalyst. When there is no catalytic material, it has been observed that the resultant PCD body nevertheless includes empty pores where the adjacent crystals do not fit completely together.

Because it has been observed that the PCD bodies formed in the presence of a catalyst generally have superior properties to those formed without, it is presently preferred to use for the present invention a PCD body which was formed with a catalytic material and then has had most of that catalytic material removed in a subsequent step. Most preferably, the catalytic material is cobalt which is at least partially removed from the pores by treating the PCD body in a hot bath which is 15 percent concentrated HF acid and 85 percent concentrated $HNO_3$ (15/85).

In an alternative embodiment, the PCD is made with pieces of precemented metal carbide dispersed through the PCD as taught in U.S. Pat. No. 4,525,178, the entire disclosure of which is incorporated herein by reference. Because it was demonstrated in that patent that the PCD formation may be enhanced by the inclusion of precemented carbide pieces dispersed in the diamond powder before sintering, it may be desirable for purposes of the present invention to so include such precemented carbide pieces even though most of them will be leached out before infiltration.

The size and shape of the porous PCD body can be varied depending on the desired end use of the infiltrated product. The inventors have observed that, because the infiltrated PCD bodies of the present invention have exhibited increased thermal stability, they are particularly well suited to be used in matrix applications. That is, they can be made in relatively small sizes (i.e. between 170 and 7 U.S. mesh) which can be set in a molten matrix to form cutting elements for core drills, rock saws and the like. When this is the desired end use of the infiltrated PCD body, it is preferred to start with PCD bodies formed according to the preferred embodiment described in U.S. patent application No. 736,422 filed by the same inventors on May 20, 1985, the entire disclosure of which is incorporated herein by reference. The PCD bodies described in that application are cubes of PCD which are about 0.71 mm on each side which equates to about 25 U.S. mesh. The PCD is formed from 0 to 5 micron size diamond crystals mixed with powdered cobalt catalyst at about 13% by weight of the diamond/cobalt mixture. After pressing, the cubes are treated to an acid bath to remove as much of the accessible cobalt as possible thereby producing PCD cubes with empty pores communicating with the external surfaces of the cubes.

While it is preferred to start with these relatively small PCD bodies to thereby make pieces suitable for setting in a matrix, it is also possible to use the present invention to infiltrate larger bodies of porous PCD useful for other applications. For example, the tool components described in the '380 and and '248 Patents mentioned above can also be infiltrated according to the present invention to thereby improve the thermal stability and toughness of these PCD pieces intended to be used as individual cutting or grinding elements.

The next step in the process of the present invention is to provide a quantity of either a silicon containing alloy or a mixture which will produce a silicon containing alloy upon heating and pressing. The inventors have discovered that silicon containing alloys display significant advantages when used to infiltrate the pores of a PCD body. In particular, the inventors have observed that the PCD bodies infiltrated with the silicon containing alloys have increased thermal stability and toughness.

While not wishing to be bound by any particular theory and not having a full understanding of the chemical and physical phenomena involved, the inventors have theorized that one reason for the successful use of silicon containing alloys may involve the fact that silicon alloys in general have lower coefficients of thermal expansion than do the metals used as catalysts in PCD formation. As a result, infiltrating the pores of the PCD body with the silicon containing alloys may allow for the reduction of the surface area of exposed diamond, while avoiding the problem caused by excessive thermal expansion within the pores.

Another possible theory to explain why silicon containing alloys have shown such remarkable properties with the present invention is the fact that silicon is not a catalyst for the conversion of graphite to diamond or vice versa. This is important as it has been previously observed that, if a catalytic material is left in the pores of the PCD body, reversion of the diamond to graphite can occur at lower temperatures and/or at higher rates than without the catalytic material.

Yet another possible theory to explain the importance of the silicon in the silicon containing alloy is that when heated together to very high temperatures silicon and diamond form silicon carbide. It is therefore theorized that there may be some degree of silicon carbide formation which helps to bind the infiltrant into the pores. However, the inventors have not established the presence or nonpresence of such silicon carbide. Indeed, it is important to bear in mind that each of these theories are put forth only as possible explanations for the observed results. As such, they should in no way be seen to limit the scope of the present invention.

The inventors discovered that, although silicon had some promising physical and chemical properties, it could not be used by itself for the present purpose. In particular, in an experiment wherein porous PCD bodies were surrounded with silicon powder and then pressed to about 55 Kbars and heated to about 1500° C., all of the PCD was turned into silicon carbide. Fortunately however, the inventors have discovered that silicon can be used in an infiltrant if it is contained in an alloy with another material. As used in this description and the following claims, the term "silicon containing alloy" is intended to mean an alloy which comprises silicon and at least one metal. Also, the inventors intend the term "alloy" to carry its broadest meaning, i.e. a "mixture, solid solution or combination of two or more elements, at least one of which is a metal, forming an apparently homogeneous mass" (*Concise Chemical and Technical Dictionary*, Chemical Publishing Co., 1974).

The metal component of the alloy can be selected from all metals which form an alloy with silicon. According to one preferred embodiment, the metal is selected from those which are considered to be catalysts for the conversion of graphite to diamond, namely the group VIII metals, Cr, Mn, and Ta. As used herein, the term "catalytic material" refers to these metals, their alloys with each other, and their alloys with noncatalytic metals. See U.S. Pat. No. 4,224,380, col. 3, lines 12-19.

For reasons discussed below, nickel is presently the most preferred metal component of the silicon containing alloy. In another preferred embodiment, aluminum is presently considered the best metal component for the silicon containing alloy.

One advantage of using the silicon in alloy form is that it has been observed to prevent such rapid formation of silicon carbide. That is, the inventors' experiments have shown that the infiltration with the silicon containing alloys resulted in a small amount if any of silicon carbide formation. In other words, the PCD structure remained intact after the infiltration. It is noted that this result may also be due in part to the fact that, because the silicon containing alloys melted at lower temperatures, the infiltration was carried out at temperatures lower than that when elemental silicon was used.

A similar advantage of using the silicon containing alloy is the fact that the addition of the silicon to the second component has been observed to change the reactivity of the second component with the diamond. For example, nickel by itself is known to be a catalyst for the conversion of graphite to diamond. However, the inventors have found that nickel silicon alloys are non-catalytic, at least at standard conditions. In particular, a powdered mixture of nickel (67 percent by weight) and silicon (33 percent by weight) was added to graphite and then pressed to about 57 Kbars and about 1300° C., i.e. conditions at which the alloy should have catalyzed the conversion of the graphite to diamond, yet no diamond synthesis was observed. This changing of a catalytic material to a non-catalytic material is thought to be an important benefit of the present invention because, as mentioned above, the presence of a catalytic material in the pores of PCD can lead to graphitization at lower temperatures and/or higher rates.

Another advantage the inventors have found with using a silicon containing alloy as the infiltrant in the present invention is the fact that the composition of the alloy, i.e. the relative amount of the silicon and the metal, can be selected so that the alloy has a lower melting point than either the silicon by itself or the metal. For example, the silicon nickel alloy with 33 percent by weight silicon and 67 percent by weight nickel has a melting point of about 990° C. which is significantly lower than that of silicon at 1420° C. or nickel at 1452° C. (all at standard pressure). As mentioned above, the lower melting point is beneficial so as to allow for liquification and infiltration at temperatures below those at which damage to the PCD structure could occur. In particular, if the infiltrating alloy is one that melts below about 1200° C., it is not necessary to perform the infiltration at ultrahigh pressures because the PCD should be stable to that temperature at normal pressures. This is an important advantage in that expensive ultrahigh pressures presses would therefore not be required.

The silicon containing alloy for the infiltrant can be obtained in one of two ways. One way is to obtain a quantity of the desired alloy itself. This alloy is preferably obtained in powdered form to allow for surrounding the porous PCD bodies with it. However, in alternative embodiments the silicon containing alloy can be obtained in a sheet which is placed adjacent to the PCD body.

The second way is to obtain quantities of the components of the desired alloy, i.e. the silicon and the metal(s), to mix the powders and surround the PCD bodies with that mixture, and then to allow the alloy to form upon heating of the reaction chamber just prior to infiltration of the PCD bodies. Likewise, it is preferred to obtain the components of the alloy in a powdered form to allow for mixing and surrounding the porous PCD bodies.

The selection of the metal component of the silicon containing alloy is influenced by the melting point of the resultant alloy. In this regard, aluminum, copper, and nickel appear preferable. In addition, the preference of the metal component is naturally affected by the performance testing which showed nickel and aluminum as contributing the most to the toughness of the PCD bodies.

The preferred composition, i.e. relative amounts of the components of the silicon containing alloy, are at present dictated by melting point considerations. That is, the composition is preferably selected so as to produce the lowest melting point. For example, the composition of examples 1-11 were selected on the basis of information obtained from phase diagrams found in *Metals Reference*, 4th Ed., Smithells, C. J., Plenum Press, N.Y., 1967. Accordingly, the preferred composition for metals other than those described in the following examples can be so determined by one ordinarily skilled in the art. In addition, the composition with any particular metal component may require optimization by experimentation, but such experimentation is also considered within the ordinary skill of the art.

When, in accordance with one of the preferred embodiments, nickel is used as the metal component of the silicon containing alloy, it is most preferred to include the silicon as between about 28 and 42 percent by weight because, as shown in the phase diagrams referred to above, the melting point remains under 1000° C. in this range of compositions. Similarly, when using aluminum in accordance with another of the preferred embodiments, one can include up to 45 percent by weight silicon and obtain a melting point below 1000° C. Accordingly, a range of 10 to 45 weight percent silicon is most preferred when using aluminum.

The amount of infiltrant that ends up in the pores of the PCD body is likely influenced by many factors, such as the temperature and pressure used in the infiltration process, and the chemical and physical properties of the infiltrant at the particular temperature and pressure used. It is presently preferred to produce an infiltrated PCD body which has between 5 and 25 percent by weight infiltrant. In the process it is preferred to provide an excess of the infiltrant in order to allow for as much infiltration as will occur under the conditions selected.

The process of infiltrating the PCD bodies according to the present invention includes the step of surrounding the bodies with either the intended infiltrant or the components of that intended infiltrant as described above. This surrounding step is preferably accomplished by placing a bottom layer of the infiltrating material, preferably in powdered form, in a reaction chamber; placing the PCD body in the reaction chamber; and then adding more of the infiltrating material to the reaction chamber until the PCD body is completely surrounded. It should be noted, that, although it is preferable to infiltrate the PCD body from all sides, there may be other embodiments in which only one or more sides are intended to be infiltrated. For example, the PCD body may have a backing, such as cemented carbide, on one or more sides.

In the interest of efficiency, it is preferred to include more than one PCD body in the reaction cell. Particularly when making PCD bodies which are intended for use in matrices, it is most preferred to include several PCD bodies.

Figure 1:
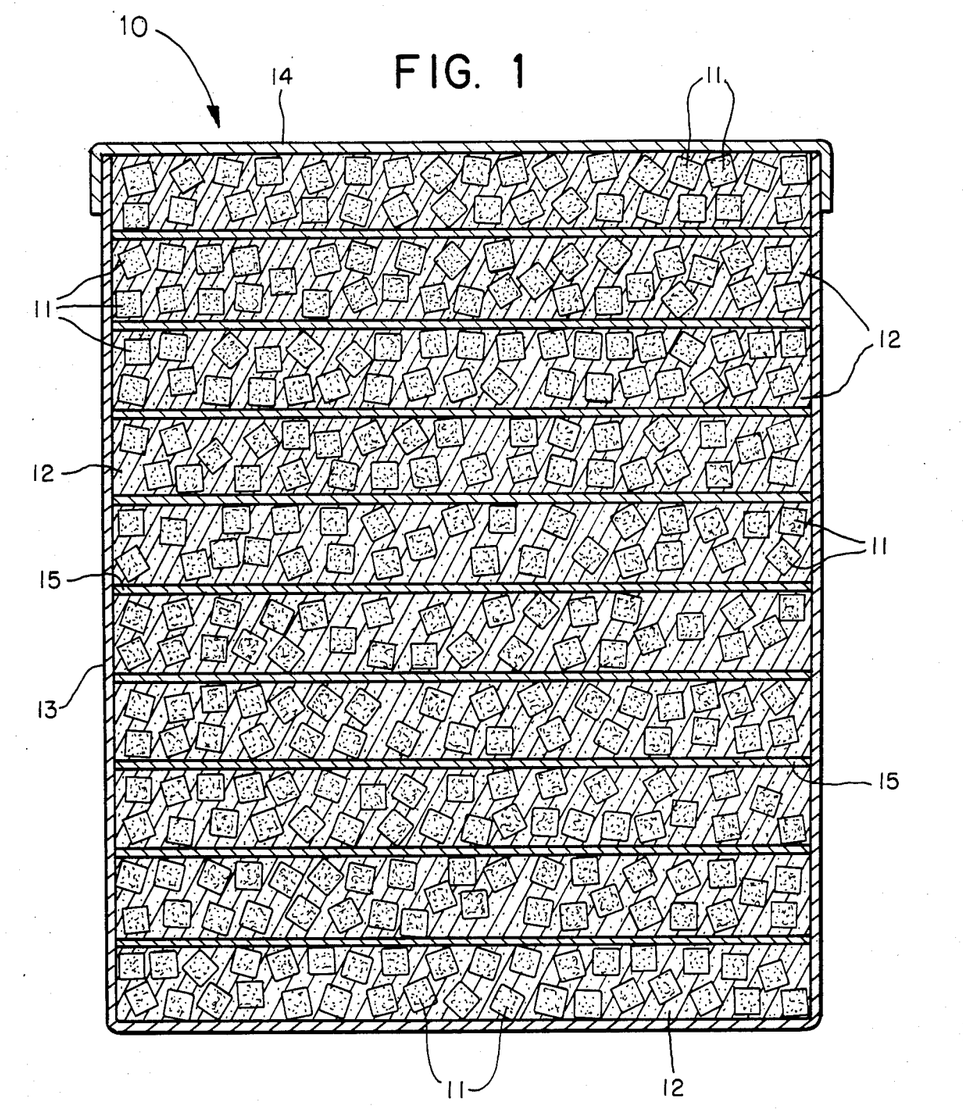
FIG. 1 is a cross section of a pressing chamber designed for infiltrating multiple pieces of porous PCD.

The configuration shown FIG. 1 illustrates part of the presently most preferred embodiment of the process of this invention. FIG. 1 is a cross section taken through a reaction chamber 10 designed to infiltrate several relatively small PCD bodies 11 in a single press cycle. In this embodiment, the PCD bodies 11 are cubes which are about 0.71 mm on each side (25 U.S. mesh). A total of about 960 of them are placed in this reaction cell per press cycle. The process starts with placing a layer of the infiltrating material 12 in the bottom of a can 13. The infiltrating material in this embodiment consists of nickel and silicon powders. The nickel powder is present in about 67 weight percent and is 200/325 mesh. The silicon powder is present in about 33 weight percent and is 400 mesh and below. The can 13 shown here is cylindrical with a closed bottom and is here made from molybdenum, but can also comprise titanium, zirconium, or any other metal or alloy which will not be rapidly dissolved by the infiltrant. Next, a quantity of the PCD cubes 11 are poured into the can 13. Then enough nickel/silicon powder 12 is added to cover the PCD cubes 11. More cubes 11 are added followed by more nickel/silicon powder 12.

Following the first two layers of cubes 11, a disc 15 with a diameter slightly less than the internal diameter of the can is placed in the can 13. Preferably, this disc is made from the same material as the can 13. The discs 15 provide one benefit of subdividing the can 13 for easier filling. The process is then repeated by alternately pouring in nickel/silicon powder 12 and cubes 11. After the second two layers of cubes 11, another disc 15 is placed in the can 13. This is repeated with cubes, powder, and discs until reaching the top of the can 13. Finally, a tight fitting cap 14, also preferably made from molybdenum, is placed on top of the can 13.

This reaction chamber 10 is then put into a pressing cell (not shown) which is in turn placed in a press (also not shown). The construction of various types of pressing cells is well known in the art and depends primarily on the type of press which is to be used. In the preferred embodiment, the pressing cell is similar to that described in U.S. Pat. No. 3,913,280, which is hereby incorporated herein by reference. In this pressing cell, the reaction chamber is surrounded by a cylinder and two end discs made from a material which is electrically insulating. Surrounding that is a graphite tube through which current is passed for heating the reaction chamber. A molybdenum disc is placed across the bottom and top of the graphite tube for conducting current to the graphite tube from the top and bottom steel rings which conduct the electricity from the anvils of the press to the molybdenum discs. Surrounding these elements is a block of pyrophyllite which both transmits pressure and forms a gasket between the anvils of the press. Discs of pyrophyllite or salt are placed in both ends of the hole through the block.

As stated, the exact construction of this and other types of pressing cells is considered well known in the art. In particular, the pressing cell described here is one suitable for use in an ultrahigh pressure and temperature press, i.e. a press capable of operating at pressures and temperatures used in synthesizing diamond and forming polycrystalline diamond. Currently, this type of press is preferred primarily on the basis of its availability to the inventors. An additional factor is that, if an alloy is selected which melts at a point above about 1200° C., the high pressure press may be beneficial in keeping the PCD at sufficient pressure to prevent reversion of the diamond to graphite. However, as long as the infiltrant is one that melts below 1200° C., the inventors are not aware of any other reason why such a high pressure press is necessary to accomplish the present process. Accordingly, the use of lower pressure presses, such as those used in conventional powder metallurgy, is considered to be within the scope of the invention and indeed an important advantage. The important requirements of the press is its ability to achieve a temperature above the melting point of the silicon containing alloy and to apply sufficient pressure to cause infiltration of the liquified alloy into the pores of the PCD body.

Referring again to the preferred embodiment, the pressing cell is placed between the anvils of an ultrahigh pressure press known as the "cubic" press described in U.S. Pat. No. 3,813,280. The "belt" type press described in U.S. Pat. No. 3,745,623 is also suitable as well as any other ultrahigh pressure or regular press. Pressure and heat are then applied to effect melting of the infiltrant material 12 and then to cause its infiltration into the pores of the PCD bodies 11. The temperature required depends on the composition of the infiltrant. To avoid graphitization or oxidation of the diamond, the temperature should be less than about 1600° C. when using ultrahigh pressures (in the order of about 60 Kbars), and should be less than about 1200° C. when not using such ultrahigh pressures. The time should be that sufficient to allow proper melting and infiltration by the silicon containing alloy. The most preferred cycle is to take the reaction chamber from room temperature to about 150° C. above the melting point of the alloy in about 80 seconds, to hold at that temperature for about 20 seconds, and then to allow to cool to just above room temperature before removing from the press.

As mentioned, when the infiltrant material is placed in the reaction chamber 10 in an unalloyed form, i.e. powders of silicon and the metal component, it has been found that the heat will melt and fuse the silicon and the metal component to thereby create the silicon containing infiltrant. At present, there have been no significant observed differences in the results when using prealloyed versus using unalloyed silicon together with the metal as the starting materials. However, for purposes of convenience as well as the ability to vary the composition, the inventors currently prefer to start with powders of silicon mixed with powders of the metals.

After the press cycle, the pressing cell is broken away from the reaction chamber. The reaction chamber and the surrounding excess silicon containing alloy are then removed from around the PCD bodies. The preferred method to accomplish this removal is to put the reaction chamber in a hot bath of 15/85 HF/HNO$_3$. The PCD is left in the acid bath until all visible reaction ceases. The result is that the molybdenum is dissolved away first and then the excess silicon containing alloy from outside the PCD bodies. By watching the reaction closely, the PCD bodies can be removed before much of the infiltrant is leached out of the pores. For example, when the infiltrant is a 67/33 nickel/silicon alloy, the average time needed in the acid bath has been about 20 minutes. Herein is another advantage of the molybdenum discs in the reaction chamber. Because the molybdenum is dissolved first, it leaves each of the PCD bodies with about the same volume of silicon containing alloy between it and the acid. As a result, the PCD bodies become "cleaned" at about the same rate and they can all be removed at the same time with relatively uniform amount of leaching. In alternative embodiments, other materials can be used for the can and the subdividing discs, with the requirement that the material is not dissolved by the infiltrant and is dissolved by the chemical bath faster than the infiltrant. Alternatives to the acid bath include other chemical or electrolytical treatments as well as subjecting the reaction chamber to grit blasting wherein the can and the excess silicon containing alloy could be worn away from the PCD bodies.

After this cleaning process, the resultant PCD bodies are the same shape and size as they started, but they are more dense owing to the presence of the silicon containing alloy located in the previously empty pores. As will be shown by the following examples and test results, the now infiltrated PCD bodies have increased thermal stability and toughness.

EXAMPLES

EXAMPLE 1

About 6 carats of 25 mesh acid leached (i.e. to remove the accessible cobalt catalyst) PCD cubes (about 960 0.71 mm cubes) were placed in a reaction chamber and surrounded with a mixture of nickel and silicon powder as described in connection with FIG. 1 above. The nickel powder was present at about 67 percent by weight of the mixture and had a particle size of 200/325 mesh. The silicon powder was present at about 33 percent by weight of the mixture and had a particle size of less than 400 mesh. According to the phase diagram referred to above, this mixture has a melting point of 990° C. at standard pressure The reaction chamber was then placed in a pressing cell which was in turn placed in an ultrahigh pressure press as described above and subjected to a pressure of about 55 Kbars. The reaction chamber was heated to 1200° C. in 80 seconds and then held at that temperature for 20 seconds. It was then allowed to cool to approximately room temperature and removed from the press.

The pressing cell was broken away and the reaction chamber was put in a hot bath of 15/85 HF/HNO$_3$ until visible reaction ceased, i.e. about 20 minutes. The weight of 100 of these infiltrated PCD cubes were compared to the weight of 100 non-infiltrated cubes to determine that the nickel/silicon infiltrant comprised about 15 percent by weight of the infiltrated cube.

A quantity of the resultant infiltrated PCD cubes were tested for friability which is an indicator of the toughness, i.e. the fracture resistance, of the bodies. The test consists of placing about 0.2 grams of the pieces in the ½ × 1-½" steel jar of a "Wig-L-Bug" dental amalgam mixer with a ¼" steel ball. The jar was vigorously vibrated for 20 seconds. The results were measured in terms of the friability index which is the percent of pieces retained by a 35 U.S. mesh screen, i.e. what percentage remained bigger than 35 mesh after the above treatment. Thus, a higher friability index relates to a higher toughness or impact resistance in the material.

The infiltrated PCD cubes of Example 1 had a friability index of 73%. In comparison, non-infiltrated leached PCD cubes which were identical to those used in Example 1 had a friability index of 28%.

As a test for thermal stability, a quantity of pieces from Example 1 were heated to 1150° C. under Argon for about 5 minutes. After this heat treatment, the friability index of the cubes was measured at 46%. In comparison, the non-infiltrated PCD cubes had a friability index of 24% after this same heat treatment. In addition, it was observed that after the heat treatment, a slight amount of the nickel/silicon infiltrant had exuded from the surfaces of the cubes.

EXAMPLE 2

The same materials were used and the same procedure was followed as in Example 1 with the exception that the peak temperature was about 1125° C. The friability index of these cubes was found to be 49%.

EXAMPLE 3

The same materials and procedures were used as in Example 1 except that peak temperature was about 1025° C. The resulting cubes had a friability index of about 53%.

EXAMPLE 4

The same materials and procedures were used as in Example 3 except that the nickel powder had a particle size of 1-5 microns. The resulting cubes had a friability index of about 38%.

EXAMPLE 5

The same materials and procedures were used as in Example 4 except that the peak temperature was about 1200° C. The resulting cubes had a friability index of about 60%.

EXAMPLE 6

The same materials and procedures were used as in Example 1 except that a pre-fused nickel/silicon alloy was used. The alloy was powdered and consisted of 62 weight percent nickel and 38 weight percent silicon. The measured friability index for these cubes was about 59%.

EXAMPLE 7

The same materials and procedures were used as in Example 1 except that the pressure was 45 Kbars and the nickel powder had the particle size of 1-5 microns. The resultant cubes had a friability index of about 60%.

EXAMPLE 8

The same materials and procedures were used as in Example 1 except that 1-5 micron nickel powder was used and the pressure was about 55 Kbars and the temperature was about 1100° C. for about 80 seconds at temperature. The resultant friability index was about 51%. After the heat cycle in argon described in Example 1, the friability index remained at about 51%. Some of the pieces were then subjected to the same temperature, 1050° C., for 5 minutes in open air. The friability index of those pieces was measured at about 48%. In contrast, the inventors have observed that the non-infiltrated leached PCD cubes typically oxidize at that temperature when exposed to air.

EXAMPLE 9

The same materials and procedures were used as in Example 1 except that the nickel powder was replaced with aluminum powder. The mixture was 88 weight percent aluminum powder, with the remainder being silicon powder as described above. The estimated melting temperature for this mixture is 557° C. The peak temperature in the pressing cycle was 770° C. The resultant cubes had about 7 percent by weight infiltrant and a friability index of about 11%. After the heat treatment in argon described above, the friability index was improved for reasons as yet unknown to about 39%.

EXAMPLE 10

The same materials and procedures were used as in Example 1 except that copper powder was used in the place of nickel powder. The mixture was 87 weight percent copper powder, with the rest being silicon powder as described above. The predicted melting point for this mixture is 802° C. and the infiltration was run to 1000° C. The resultant cubes had about 18 percent by weight infiltrant and a friability index of about 36% without heat treatment and about 24% with.

EXAMPLE 11

The same materials and procedures were used as in Example 1 except that cobalt powder was used in the place of nickel powder. The mixture was 89 percent by weight cobalt and had a predicted melting point of 1195° C. The infiltration press cycle was run to 1290° C. The resultant cubes had about 23 percent by weight infiltrant and a friability index of 30% without heat treatment and 1.5% following.

Additional Experiments

In addition to the examples listed above, other experiments were run to compare the results when materials other than silicon containing alloys were used as infiltrants.

As mentioned, an attempt was made to infiltrate leached PCD bodies with silicon by itself. The result was that no PCD remained as all of it was converted to silicon carbide.

Copper was also tried by itself as an infiltrant. The resultant cubes had about 20% by weight copper infiltrant and had a friability index of only 12%.

Aluminum was likewise tried as an infiltrant by itself. As far as could be determined, no aluminum infiltrated the pores of the PCD cubes. Also, the friability index of the cubes was lowered to 18%.

A 65/35 copper/manganese alloy was also used as an infiltrant. The cycle was run to 1025° C. and the pieces had about 23% infiltrant. The resultant cubes had a friability index of 26% without heat treatment and 12% with.

Finally, a 92/8 nickel/boron alloy was used as an infiltrant. The cycle was run to 1150° C. and the pieces had about 18% infiltrant. The infiltrated cubes had a friability index of about 31% without a heat treatment and about 5% with it.

These results are summarized in the Table below:

| | | TEST RESULTS | | | | |
|---|---|---|---|---|---|---|
| Infiltrant (Comp.) | Tmelt °C. | Trun °C. | Wt. % Infil | Fri. In. w/o Ht | Fri. In. w/ Ht | Exudant |
| None | — | — | — | 28 | 24 | — |
| Ni Si(67/33) | 990 | 1200 | 15 | 73 | 46 | Slight |
| Ni Si(67/33) | 990 | 1125 | 49 | — | — | — |
| Ni Si(67/33) | 990 | 1025 | 53 | — | — | — |
| Ni Si(62/38) (pre-alloyed) | 990 | 1200 | 59 | — | — | — |
| Al Si(88/12) | 557 | 770 | 7 | 11 | 39 | No |
| Cu Si(87/13) | 802 | 1000 | 18 | 36 | 24 | Yes |
| Co Si(89/11) | 1290 1195 | 23 | 30 | 1.5 | | No |
| Si | 1420 | 1500 | All PCD Converted to SiC | | | |
| Cu | 1080 | 1220 | 20 | 12 | — | |
| Al | 660 | 825 | 0 | 18 | 23 | — |
| Cu Mn(65/35) | 870 | 1025 | 23 | 26 | 12 | Yes |
| Ni B (92/8) | 990 | 1150 | 18 | 31 | 5 | Yes |

Thus, although the reasons are not fully understood, it has been shown that the silicon containing alloys perform the best as infiltrants for porous PCD bodies according to the present invention. It has also been shown that the performance of the silicon containing alloys as infiltrants depends on the selection of the metal component, the relative amounts of the metal and the silicon, and likely on other features such as the pressure, temperature and times of the infiltration press cycle. However, it should be clear that each of these variations is within the ordinary skill in the art in light of the preceding description and explanation. Accordingly, each of these variations is considered within the scope of the invention as defined in the following claims.

What is claimed is:

1. A polycrystalline diamond body comprising:
   a quantity of diamond crystals directly bonded to each other to form polycrystalline diamond, said crystals defining a network of pores which communicate with an external surface of the body, and said pores having been created during the formation of the polycrystalline diamond; and a quantity of silicon containing alloy infiltrated into at least a portion of said pores from the external surface of the body in a step subsequent to the formation of the polycrystalline diamond.

2. The polycrystalline diamond body as in claim 1 wherein the silicon containing alloy comprises silicon and a catalytic material.

3. The polycrystalline diamond body as in claim 1 wherein the silicon containing alloy comprises silicon and at least one other material selected from the group consisting of nickel, aluminum, copper, cobalt, and mixtures thereof.

4. The polycrystalline diamond body as in claim 3 wherein the silicon comprises between 10 and 45 percent by weight of the silicon containing alloy.

5. The polycrystalline diamond body as in claim 1 wherein the silicon containing alloy comprises silicon and nickel.

6. The polycrystalline diamond body as in claim 5 wherein the silicon comprises between 28 and 42 percent by weight of the silicon containing alloy.

7. The polycrystalline diamond body as in claim 5 wherein the silicon comprises about 33 percent by weight of the silicon containing alloy and the nickel comprises about 67 percent by weight of the silicon containing alloy.

8. The polycrystalline diamond body as in claim 1 wherein the silicon containing alloy comprises silicon and aluminum.

9. The polycrystalline diamond body as in claim 8 wherein the silicon comprises between 10 and 45 percent by weight of the silicon containing alloy.

10. The polycrystalline diamond body as in claim 9 wherein the aluminum comprises between 55 and 90 percent by weight, of the silicon containing alloy.

11. A process for producing a polycrystalline diamond body with increased thermal stability comprising the steps of:

providing a porous polycrystalline diamond body comprising a quantity of diamond crystals directly bonded to each other to form polycrystalline diamond, said crystals defining a network of pores which communicate with an external surface of the body, said pores having been created during the formation of the polycrystalline diamond; and providing a quantity of a silicon containing alloy;

surrounding the porous polycrystalline diamond body with the quantity of a silicon containing alloy;

subjecting the porous polycrystalline diamond body and the surrounding quantity of a silicon containing alloy to sufficient heat and pressure to cause the silicon alloy to infiltrate at least a portion of said pores.

12. The process of claim 11 wherein the silicon containing alloy comprises silicon and a catalytic material.

13. The process of claim 11 wherein the silicon containing alloy comprises silicon and at least one other material selected from the group consisting of nickel, aluminum, copper, cobalt, and mixtures thereof.

14. The process of claim 13 wherein the silicon comprises between 10 and 45 percent by weight of the silicon containing alloy.

15. The process of claim 11 wherein the silicon containing alloy comprises silicon and nickel.

16. The process of claim 15 wherein the silicon comprises between 28 and 42 percent by weight of the silicon containing alloy.

17. The process of claim 16 wherein the nickel comprises between 58 and 72 percent by weight of the silicon containing alloy.

18. The process of claim 11 wherein the silicon containing alloy comprises silicon and aluminum.

19. The process of claim 18 wherein the silicon comprises between 10 and 45 percent by weight of the silicon containing alloy.

20. The process of claim 19 wherein the aluminum comprises between 55 and 90 percent by weight of the silicon containing alloy.

21. The process of claim 11 wherein the silicon containing alloy is provided in powdered form.

22. The process of claim 11 wherein the porous polycrystalline diamond body is placed in a reaction chamber with several other such porous polycrystalline diamond bodies which bodies are then surrounded by the silicon containing alloy after which the reaction chamber is subjected to said heat and pressure sufficient to cause infiltration by said silicon containing alloy.

23. The process of claim 22 wherein excess silicon containing alloy is removed by placing the polycrystalline diamond body in a chemical bath for a time long enough to remove the silicon containing alloy from the external surface but short enough to prevent significant depletion of the silicon containing alloy from the pores.

24. A process for producing a polycrystalline diamond body with increased thermal stability comprising the steps of:

providing a porous polycrystalline diamond body comprising a quantity of diamond crystals directly bonded to each other to form polycrystalline diamond, said crystals defining a network of pores which communicate with an external surface of the body, said pores having been created during the formation of the polycrystalline diamond; and providing a mixture comprising silicon and a second component which will form an alloy with silicon;

surrounding the porous polycrystalline diamond body with the mixture;

subjecting the porous polycrystalline diamond body and the surrounding mixture to such heat and pressure sufficient to cause the silicon and the second component to form a silicon containing alloy and sufficient to cause the alloy to infiltrate at least a portion of said pores.

25. The process of claim 24 wherein the second component of the mixture comprises a catalytic material.

26. The process of claim 24 wherein the second component of the mixture is selected from the group consisting of nickel, aluminum, copper, cobalt, and mixtures thereof.

27. The process of claim 26 wherein the silicon comprises between 10 and 45 percent by weight of the mixture.

28. The process of claim 24 wherein the mixture comprises silicon and nickel.

29. The process of claim 28 wherein the silicon comprises between 28 and 42 percent by weight of the mixture.

30. The process of claim 29 wherein the nickel comprises between 58 and 72 percent by weight of the mixture.

31. The process of claim 24 wherein the mixture comprises silicon and aluminum.

32. The process of claim 31 wherein the silicon comprises between 10 and 45 percent by weight of the mixture.

33. The process of claim 32 wherein the aluminum comprises between 55 and 90 percent by weight of the mixture.

34. The process of claim 24 wherein the silicon and the second component of the mixture are provided in powdered form.

35. The process of claim 24 wherein the porous polycrystalline diamond body is placed in a reaction chamber with several other such porous polycrystalline diamond bodies which bodies are then surrounded by the mixture, after which the reaction chamber is subjected to said heat and pressure sufficient to cause the formation of the silicon containing alloy and to cause infiltration of said silicon containing alloy.

36. The process of claim 35 wherein excess silicon containing alloy is removed by placing the polycrystalline diamond body in a chemical bath for a time long enough to remove the silicon containing alloy from the external surface but not long enough to allow significant depletion of the silicon containing alloy from the pores.

37. A process for producing a polycrystalline diamond body with increased thermal stability comprising the steps of:
providing a plurality of polycrystalline diamond bodies each comprising a quantity of diamond crystals directly bonded to each other to form polycrystalline diamond, said crystals defining a network of pores which communicate with an external surface of the body, and said pores having been created during the formation of the polycrystalline diamond; and
providing a powdered mixture comprising silicon powder and powder of a material selected from the group consisting of nickel, aluminum and mixtures thereof;
placing said plurality of polycrystalline diamond bodies in a reaction chamber;
surrounding said plurality of polycrystalline diamond bodies with said powdered mixture;
subjecting said reaction chamber with its contents to sufficient heat and pressure to cause the powdered mixture to form a silicon containing alloy and sufficient to cause the silicon containing alloy to infiltrate at least some of the pores; and
removing excess silicon containing alloy from the external surface of the polycrystalline diamond bodies.

38. The process of claim 37 wherein the removing step is accomplished by chemical leaching.

39. The process of claim 38 wherein the reaction chamber is subdivided with pieces of a metal selected so as to dissolve more rapidly than said excess silicon containing alloy during said chemical leaching.

* * * * *

UNITED STATES PATENT AND TRADEMARK OFFICE
CERTIFICATE OF CORRECTION

PATENT NO. : 4,664,705

DATED : May 12, 1987

INVENTOR(S) : M. Duane Horton et al.

It is certified that error appears in the above-identified patent and that said Letters Patent is hereby corrected as shown below:

IN REFERENCES CITED

In column 1, line 4 of the References Cited, please delete "Pipe" and substitute therefor --Pope--.

IN THE ABSTRACT

In column 2, line 3 of the Abstract, please delete "one" and substitute therefor --some--.

IN THE DETAILED DESCRIPTION

In column 8, line 2, after "nickel/" please delete the hyphen.

Signed and Sealed this

Fourth Day of July, 1989

Attest:

DONALD J. QUIGG

Attesting Officer

Commissioner of Patents and Trademarks